June 6, 1939.  H. MULCH  2,160,890
VENTILATING DEVICE FOR PROJECTION APPARATUS
Filed Feb. 5, 1938
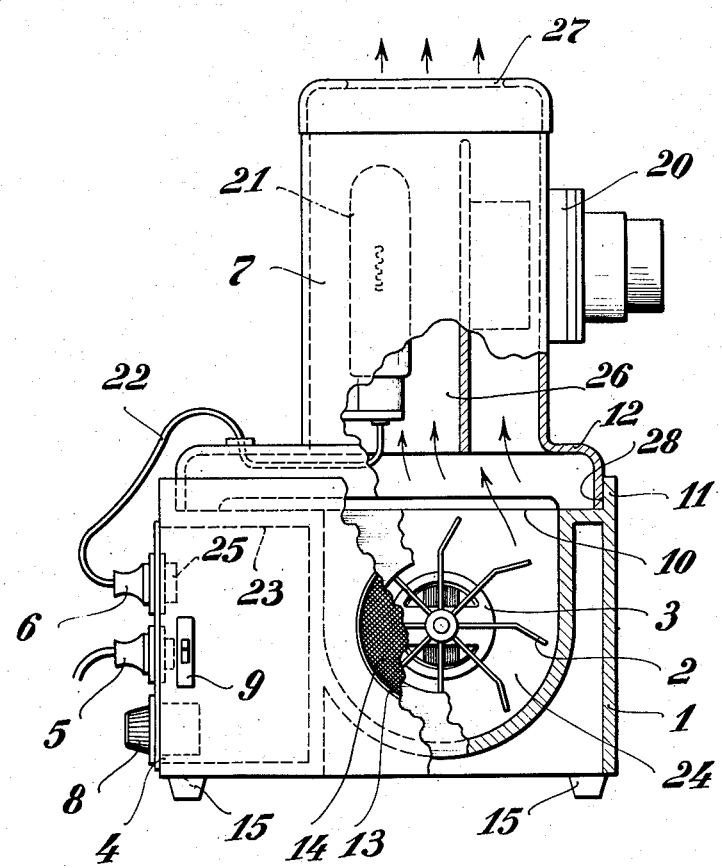
INVENTOR
*Hans Mulch*
BY
*Ivan E. A. Konigsberg*
ATTORNEY Patented June 6, 1939

2,160,890

UNITED STATES PATENT OFFICE 2,160,890

VENTILATING DEVICE FOR PROJECTION APPARATUS

Hans Mulch, Wetzlar, Germany, assignor to Ernst Leitz, G. m. b. H., Wetzlar, Germany Application February 5, 1938, Serial No. 188,941
In Germany March 11, 1937

1 Claim. (Cl. 88—24)

This invention relates to a ventilating attachment or device to be used in connection with a smaller sized projection apparatus of the type which is especially designed for school and home use and which therefore does not include any provision for ventilation other than openings in the housing.

When such smaller apparatus is used for standard black and white projection the electric lamps are of relatively low wattage and sufficient ventilation may be obtained through openings as aforesaid. When however, such apparatus is to be used for projection in color, electric lamps of much higher wattage are used so that considerable heat is developed. In such case it is desirable and advantageous to provide a ventilating attachment.

It is an object of this invention to provide a ventilating apparatus to serve as an attachment for a projection apparatus including an arrangement whereby the projection apparatus is supported upon the ventilating apparatus.

Accordingly the invention is embodied in an apparatus arranged and designed as hereinafter set forth and as illustrated in the accompanying drawing which shows the two apparatuses arranged in mutual operative relation ready for projection, parts being in section and parts broken away.

The projection apparatus is identified by its housing 7 which is formed with a base 12. The housing contains the usual projecting mechanism as at 20 and the electric lamp 21. The wires to the latter are lead in a cable 22 to a connecting plug 6 for connection to a source of electric current.

The ventilating apparatus comprises a housing 1 having preferably rubber feet 15. The top 23 of the casing is surrounded by an upstanding wall 11, the arrangement being such that the top of the ventilator housing may receive and support the base 12 of the ventilating apparatus. The top 23 is cut out to provide a ventilation opening 10 which leads to the ventilating fan chamber 24 within the housing 1. The side walls of the housing have ventilating openings 13 preferably covered by screens 14. Within the fan chamber 24 there is suitably supported a ventilating fan 2 which is driven by a fan motor 3. The rear wall 4 of the housing conveniently carries sockets as indicated at 25 for receiving the plug 6 and another plug 5 whereby to connect an electric current supply cable to the apparatus. The numeral 8 indicates a knob for regulating the electric current in a well known manner and 9 indicates a switch.

The ventilating apparatus is so designed that the outlet opening 10 communicates directly with ventilating spaces within the projecting apparatus. These spaces have air inlets at 26 and air outlets at 27 so that the air current from the fan passes directly upward past the lamp 7 at the point where ventilation is most needed.

The recess 28 in the top of the ventilating housing 1 is dimensioned to receive the base 12 of standard projection apparatus so that the latter may rest securely in said recess with air openings in registry.

I claim:

In combination with a projection apparatus including a housing provided with a base and forming a lamp chamber, an electric lamp in said chamber, air inlets in the bottom of said housing and air outlets in the top of said housing to conduct ventilating air currents upwards through said lamp chamber; a ventilating apparatus for detachably supporting said projecting apparatus to ventilate the same, said ventilating apparatus comprising a housing consisting of side walls and a top wall, said side walls extending upwards beyond the top wall to form a recess for receiving and supporting the base of said projection apparatus, said top wall having an air outlet within said upwardly extending walls registering and communicating with the said air inlet in the bottom of the projection apparatus, a fan in said ventilating apparatus for providing an air current upwards through the projection apparatus, a motor in the ventilating apparatus for driving the said fan, means on the ventilating apparatus for supplying current to said motor and for electrically detachably connecting the said lamp to the said current supply, the said ventilating apparatus forming a selfcontained ventilating unit for detachably receiving and supporting said projecting apparatus to ventilate the same, the base of the projection apparatus fitting closely within the upwardly extending walls of the ventilating unit.

HANS MULCH.